W. S. FITZGERALD.
LEATHER SKIVING MACHINE.
No. 182,813. Patented Oct. 3, 1876.
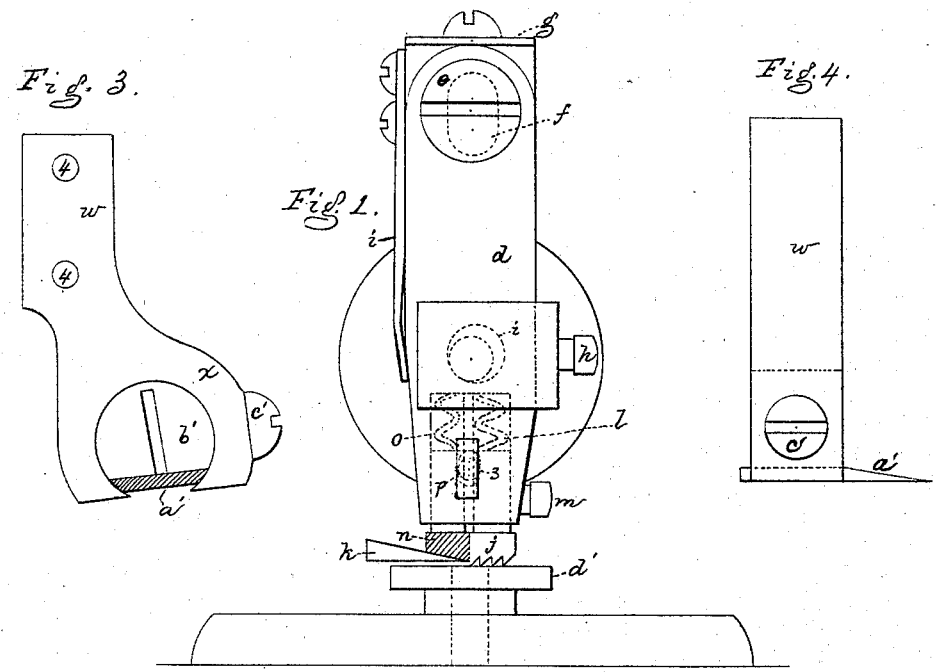
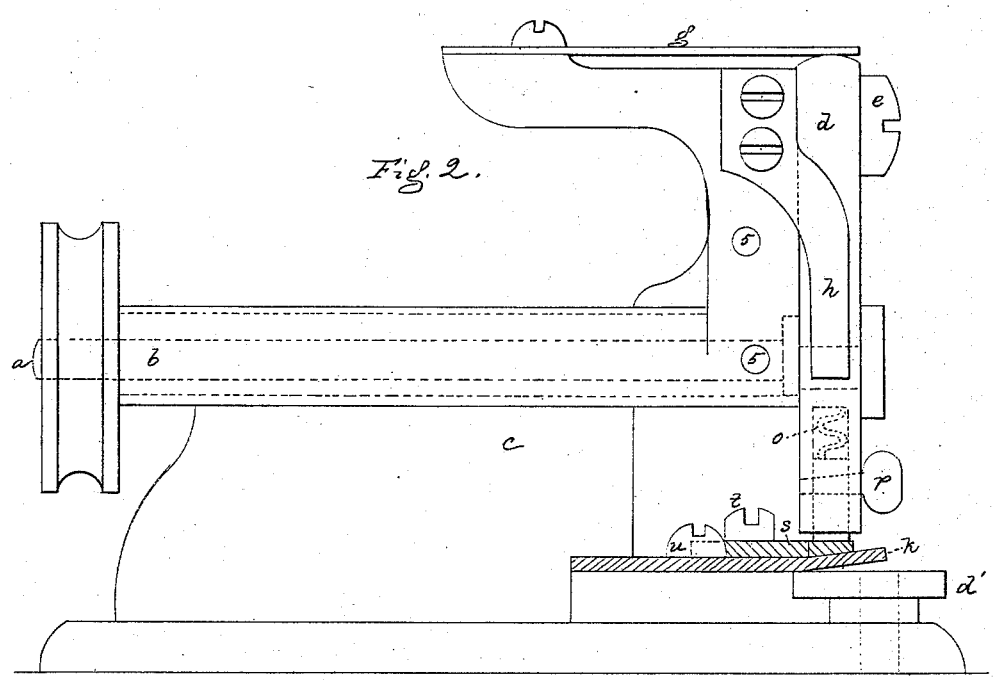
Witnesses
L. H. Latimer.
W. G. Pratt.
Inventor
Walter S. Fitzgerald
per Crosby & Gregory,
attys.

UNITED STATES PATENT OFFICE.

WALTER S. FITZGERALD, OF BOSTON, MASSACHUSETTS, ASSIGNOR TO HENRY C. WAINWRIGHT, OF SAME PLACE.

IMPROVEMENT IN LEATHER-SKIVING MACHINES.

Specification forming part of Letters Patent No. 182,813, dated October 3, 1876; application filed August 26, 1876.

*To all whom it may concern:*

Be it known that I, WALTER S. FITZGERALD, of Boston, in the county of Suffolk and State of Massachusetts, have invented an Improvement in Skiving-Machines, of which the following is a specification:

This invention relates to machines for skiving leather, or leather-board, or sheep or calf skin; and the invention consists in the combination, with a skiving-knife, of a feeding and a presser-foot, the former adapted to feed the leather or material to be skived to the knife, and the latter to bear upon the leather being skived on its passage to the knife, and then to move over the surface of the knife to prevent the leather or other material moved by the feeder from being wrinkled and gouged.

Figure 1 represents in front view a skiving-machine constructed according to this invention; Fig. 2, a side view thereof. Fig. 3 is a front view of an adjustable knife-holder; and Fig. 4 is a side view of Fig. 3.

The main shaft $a$ of the machine (shown in Fig. 2 as extended through the bearing $b$, forming part of the frame $c$) has at its forward end an eccentric crank-pin, provided or not with a friction-roller, and fitted to an opening (shown in dotted lines 2, Fig. 1) made in the feed and presser carrying bar $d$, having its fulcrum, at or near its upper end, on a stud, $e$. The hole $f$ in this bar to receive the stud $e$ is elongated, as shown in Fig. 1, to permit the bar to move vertically. The bar is held pressed down, against the action of the crank-pin, by an adjustable spring, $g$, and it is pressed backward against an adjustable stop, $h$, by a spring, $i$, the stop regulating the extent of movement of the feed-carrying bar backward, after being moved forward by the eccentric crank-pin, or any equivalent cam. The lower end of the feed-carrying bar is provided with a hole to receive the stem or shank of a toothed feeding-foot, $j$, adapted to engage the leather, and feed it forward against the edge of the knife $k$. For ordinary or light grades of leather the feeder $j$ is acted upon by a spring, $l$, (shown in dotted lines, Fig. 1,) to permit it to adapt itself to the thickness of the leather; but, with heavy leather or leather-board, the feeder is held positively and rigidly in the bar by means of a set-screw, $m$, so that the teeth of the feeder may certainly engage and move the material. In a second hole at the lower end of the feed-carrying bar is placed the shank or stem of the presser $n$, it being acted upon by a spring, $o$. (Shown in dotted lines.) The lower face of this presser $n$ is substantially smooth, is inclined or beveled to correspond, substantially, with the bevel of the upper surface of the knife, and it moves over such upper surface as the feeder, in its horizontal movement, moves the material being skived to the knife. The bar $d$, with its reciprocating feeder and presser, is raised and lowered by the crank-pin. The feeder, when down, engages the material, is moved laterally, carrying the material with it to the knife, and then the feeder rises, and moves back with the material. The feeder is engaged with the material, and disengaged from it, at each feeding movement, the motions being those common to a four-motioned rough-surfaced feeding device in sewing-machines.

When the feeder descends upon a piece of thin leather to move it forward to be skived, the leather would wrinkle, or ruck up between the feeder and knife-edge, if it was not held down, and to hold the leather down I provide the presser $n$. This presser moves backward and forward with the bar $d$ and feeder. When the feeder and bar move backward and engage the leather the presser descends upon the leather between the feeder and knife. In such position the forward edge of the presser rests upon or above the upper surface of the knife, and as the feeder, moved by the bar, approaches the edge of the knife the presser moves up over the inclined upper surface of the knife, thereby pressing down the leather between the forward end of the moving feeder and knife during the whole extent of the feeding movement of the feeder. The shanks of the feeder and presser are held in the bar in any suitable way. In this instance I employ a pin, $p$, extended through the bar and between the shanks, they being cut away for a short distance on their contiguous faces, as shown in dotted lines 3, Fig. 1.

The gage for the edge of the material being skived is shown at $s$, it being attached by a screw, $t$. The knife $k$, Figs. 1 and 2, is attached to the frame by a screw, $u$. The knife $k$ is a very simple form of knife, well adapted for sole-leather and leather-board; but, in practice, and for thin leather, I prefer to use a knife in a holder that will permit the edge of the knife to be placed at any required angle. This preferred form of knife-holder is shown detached in Figs. 3 and 4. The shank of this holder $w$ is adapted to be attached to the frame $c$ by means of screws (not shown) that enter holes 4 in the holder, and holes 5 in the frame $c$. The knife, in this instance, is designated by the letter $a'$, and is held in position in the holder by a circular block, $b'$, made adjustable in a circular opening or socket at the lower end of the holder, a set-screw, $c'$, holding the block and knife in position. The material to be skived is placed upon an annular support, $d'$, adapted to rotate as the material, pressed down upon it by the feeder, is moved to the knife.

This machine is adapted to skive the edges of all classes of leather, whether heavy or light, but is specially adapted to very thin leather. It reduces the edges of the leather, whether straight or curved, to uniform thickness, and does not mark or deface the face of the leather to be exposed to sight, which is specially desirable in working many kinds of leather.

In another application for a channeling-machine I have shown a feed-carrying bar with two feeders at its lower end, and the material being channeled is placed upon a rotary yielding support, the channeling-knife being between the two feeders. In this application I do not claim, broadly, any of the devices shown in that application.

I claim—

1. The skiving-knife and reciprocating engaging and disengaging feeder, in combination with a support for the material being skived, and with a presser adapted to operate or move over the surface of the knife, in advance of the feeder, (to prevent the material from wrinkling and being irregularly cut,) substantially as described.

2. The combination, with the knife, of the vibrating presser-foot, adapted to operate in advance of the feeder, and above the upper surface of the knife, substantially as and for the purpose described.

3. The knife-holder $w$, in combination with the adjustable knife $a'$ and block $b'$, substantially as described.

In testimony whereof I have signed my name to this specification in the presence of two subscribing witnesses.

WALTER S. FITZGERALD.

Witnesses:
G. W. GREGORY,
W. J. PRATT.